(12) United States Patent
Warren

(10) Patent No.: US 6,835,360 B2
(45) Date of Patent: Dec. 28, 2004

(54) COMPACT ENDOTHERMIC CATALYTIC REACTION APPARATUS

(75) Inventor: David W. Warren, Sun Valley, CA (US)

(73) Assignee: Harvest Energy Technology, Inc., Sun Valley, CA (US)

( * ) Notice: Subject to any disclaimer, the term of this patent is extended or adjusted under 35 U.S.C. 154(b) by 198 days.

(21) Appl. No.: 09/977,732

(22) Filed: Oct. 15, 2001

(65) Prior Publication Data

US 2002/0043022 A1 Apr. 18, 2002

Related U.S. Application Data

(63) Continuation-in-part of application No. 09/687,098, filed on Oct. 16, 2000, now Pat. No. 6,423,279.

(51) Int. Cl.[7] .................................................. B01J 8/02
(52) U.S. Cl. ...................... 422/190; 422/211; 422/198; 422/204; 422/206; 48/61; 48/62 R
(58) Field of Search ................................. 422/188, 211, 422/189, 190, 191, 193, 196, 197, 198, 202, 204, 206; 48/61, 62 R, 89, 119

(56) References Cited

U.S. PATENT DOCUMENTS

| | | | |
|---|---|---|---|
| 389,900 A | 9/1888 | Pratt et al. | |
| 2,066,198 A | 12/1936 | Buc | |
| 3,672,847 A | 6/1972 | Esselink | |
| 4,083,695 A | 4/1978 | Haese et al. | |
| 4,679,528 A | 7/1987 | Krans et al. | |
| 4,692,306 A | 9/1987 | Minet et al. | |
| 4,810,472 A | 3/1989 | Andrew et al. | |
| 4,909,808 A | * 3/1990 | Voecks | 48/94 |
| 4,935,037 A | 6/1990 | Koyama et al. | |
| 5,382,271 A | 1/1995 | Ng et al. | |
| 5,639,431 A | * 6/1997 | Shirasaki et al. | 422/212 |

* cited by examiner

Primary Examiner—Hien Tran
Assistant Examiner—Jennifer A. Leung
(74) Attorney, Agent, or Firm—William W. Haefliger

(57) ABSTRACT

A compact endothermic catalytic reaction apparatus for converting hydrocarbon feedstock and methanol to useful gases, such as hydrogen and carbon monoxide, comprising a tubular endothermic catalytic reactor, a radiant combustion chamber and an annular convection section. Thus tubular endothermic catalytic reactor receives radiant energy from a metal fiber burner that is disposed within the radiant combustion chamber. Combustion products from the radiant chamber enter an annular convection section wherein heat is transferred by forced convection to the tubular endothermic catalytic reactor. The combination of radiant and convective heat transfer results in a compact design of high thermal efficiency.

6 Claims, 4 Drawing Sheets

COMPACT ENDOTHERMIC CATALYTIC REACTION APPARATUS

BACKGROUND OF THE INVENTION

This application is a continuation-in-part of Ser. No. 09/687,098 filed Oct. 16, 2000 now U.S. Pat. No. 6,423,279.

This invention relates to the use of endothermic catalytic reaction apparatus operable to produce hydrogen-containing gases from hydrocarbon feedstock.

Endothermic catalytic reaction apparatus, for converting hydrocarbon feedstock to hydrogen-rich gases, is well known in the art. Commercial production of hydrogen is commonly achieved by a process known as steam reforming, that involves the endothermic reaction between a mixture of hydrocarbon feedstock and steam passed through a catalyst filled reactor tubing that is heated.

In commercial steam reformers for large-scale production of hydrogen from hydrocarbon feeds, endothermic heat is commonly supplied by the combustion of carbonaceous fuel and oxidant in a diffusion or turbulent flame burner that radiates to the refractory walls of a combustion chamber, thereby heating them to incandescence, and providing a radiant source for heat transfer to a tubular reaction chamber. Uniform radiation to the surfaces of the tubular reaction chamber is essential since excessive local overheating of the tube surface can result in mechanical failure. In large-scale commercial steam reformers, mal-distribution of heat within the furnace chamber is minimized by providing large spacing between the individual reactor tubes, the furnace walls, and the burner flames. However, for small-scale catalytic reaction apparatus that is uniquely compact, such as for the production of hydrogen for small fuel cell applications, special design features are needed to prevent tube overheating.

U.S. Pat. No. 4,692,306 to Minet and Warren describes a compact reformer comprising an annular reaction chamber concentrically disposed around an internal burner chamber containing a vertically disposed cylindrical radiant burner that uniformly radiates in the radial direction. A uniform radiation pattern to a concentrically disposed annular reaction chamber that surrounds the radiant burner, is provided, thereby avoiding the problems with flame impingement and local overheating of tube surfaces that are associated with the use of diffusion or turbulent flame burners in compact reformer apparatus.

However, there are practical limitations regarding the use of an annular reaction chamber for small-scale reformers having hydrogen production rates of less than about 1500 SCFH. It is well known that the heat transfer coefficient of gaseous reactants contained within an annular reaction chamber is directly related to the velocity of the gaseous reactants within the annular space. In order to limit the reaction chamber wall temperature, the velocity of gaseous reactants within the annular space must be sufficiently high to absorb the radiant heat flux that impinges on the reaction chamber tube walls. However, for very small-scale reformers, this requires that the width of the annular reaction chamber space be small. It is common practice in the art to limit the maximum diameter of the catalyst particles packed within an annular space to less than 20 percent of the width of the annular space in order to ensure that the catalyst is evenly distributed within the reaction chamber and to prevent gas channeling along the walls of the reaction chamber. However, for an annulus having a small width dimension, this requires use of catalyst particles of particularly small diameters thereby resulting in an undesirably high pressure drop through the catalyst bed.

The benefits of a flameless radiant burner for use in compact catalytic reaction apparatus of annular reaction chamber geometry are known. For small-scale reformer applications, a tubular reaction chamber geometry is preferred over annular reaction chamber geometry in order to simultaneously achieve high heat transfer coefficients and low pressure drops within the reaction chamber.

There is need for a compact endothermic catalytic reaction apparatus as embodied in the present invention to achieve the objects of compact design, while avoiding the problems of flame impingement, excessive reaction chamber wall temperatures, and excessive reaction chamber pressure drop by application of a tubular reaction chamber that is heated by the radiant burner. The tubular endothermic reaction chamber as disclosed herein employs a combination of catalyst particle sizes and reactant mass velocities to control the reactor pressure drop and the maximum reaction chamber tube wall temperature within certain needed limits; and the radiant burner is operated at specific ranges of combustion intensity and excess air to control surface temperature of the radiant burner within certain needed limits. The present invention extends the practical range of tubular endothermic reaction chamber geometry that can be used in combination with radiant burners for converting hydrocarbon feedstock to useful industrial gases.

SUMMARY OF THE INVENTION

It is the general object of this invention to provide a novel endothermic catalytic reaction apparatus for the production of industrial gases from a hydrocarbon or methanol feedstock that is simultaneously compact, thermally efficient, has improved life expectancy and low pressure drop, and is particularly well suited for the small scale generation of useful gases for fuel cell applications in the range of 1 k W to 50 k W.

In the present invention, a compact burner chamber employing a radiant burner assembly is configured to distribute radiant energy along the axial length of a tubular reaction chamber. In one embodiment, the radiant burner assembly comprises a woven metal fiber attached to a support structure that permits the efflux of fuel and oxidant from the burner core to the outer surface of the metal fiber. The properties of the metal fiber stabilize the combustion in a shallow zone proximal to the outer surface of the metal fiber. The combustion reaction heats the metal fiber to incandescence and provides a source of radiant energy that is transferred to the reaction chamber. In another embodiment, the radiant burner assembly comprises a porous ceramic fiber burner that accomplishes the same object by serving as a radiant source of energy.

The metal fiber of the burner typically consists essentially of an alloy containing principally iron, chromium, and aluminum and smaller quantities of yttrium, silicon, and manganese having extended life at operating temperatures up to 2000° F.

In one embodiment, the tubular reaction chamber has U-shape, and is sometimes referred to as a hairpin tube, which is substantially filled with catalyst, the tube extending into and out of the combustion chamber for gaseous flow through. The radiant burner axis is preferably vertically disposed within the combustion chamber and oriented parallel to the axis or axes of the U-tube reaction chamber. The active radiant surface of the cylindrical radiant burner assembly is defined by a geometric arc that bisects the cylindrical assembly so as to maximize the flux of radiant energy that is directed to the surface of the U-tube reaction chamber. In this embodiment, the center to center spacing between the radiant burner and the U-tube reaction chamber, and the radiation angle of the radiant burner are simultaneously controlled, or configured for high efficiency of heat transfer.

In a third embodiment, the tubular reaction chamber comprises a helical coil that is substantially filled with catalyst and has inlet and outlet portions that pass into and out of the combustion chamber. The helical coil is wrapped to form turns at specific lead angles, so that the coil free area is in the range of 50% to 75%, wherein the free area is defined by the ratio of the free area between helical tube conduits or turns and the cylindrical surface that bisects the helical coil circle or cylinder. The radiant burner axis is typically vertically disposed within the combustion chamber and the cylindrical radiant burner is located at the center of the helical coil. In this embodiment, the active radiant surface of the cylindrical radiant burner assembly is defined by a 360-degree arc.

In each embodiment, the radiant burner is operated at a combustion intensity and an excess air ratio that is carefully controlled to limit the radiant burner surface temperature to less than 2000° F., and preferably in the range of 1500° F. to 1900° F., in order to provide extended life for the radiant burner.

In each embodiment, the catalyst particle diameters and reactant mass velocities are carefully controlled to simultaneously limit the reactor pressure drop to less than 8 psi, and preferably in the range of 2 psi to 4 psi in order to limit the delivery pressure required for the hydrocarbon feeds, and to limit the reaction chamber tube wall temperatures to less than 1600° F., and preferably in the range of 1300° F. to 1500° F., in order to allow extended life of the tube using relatively inexpensive tube alloys.

In each embodiment, a portion of the combustion chamber is configured to form an annular convective chamber to enhance heat transfer from the combustion products to the tubular reaction chamber.

A further object is to provide endothermic catalytic reaction apparatus, comprising a) a combustion chamber, b) a tubular reaction chamber having two generally tubular legs extending in generally parallel, spaced apart relation within the combustion chamber, c) catalyst within said reaction chamber for reacting with a hydrocarbon and steam received within the reactor chamber, to produce hydrogen and carbon dioxide, d) a radiant burner within the combustion chamber and extending in generally parallel relation to at least one of said legs, said burner spaced from said legs, e) said two legs having axes, and said burner having an axis which is spaced in offset relation to a plane defined by said leg axes.

In yet another embodiment, the tubular reaction chamber comprises a straight tubular outer conduit concentrically disposed around an inner conduit. Catalyst is contained in the annular space between the outer conduit wall and the inner conduit wall. The tubular reaction chamber is configured so that the flow of reactant gas is directed longitudinally through the annular catalyst space in one direction and returns down the inner conduit space in the opposite direction. A portion of the tubular reaction chamber extends into the combustion chamber. One end of the tubular reaction chamber, containing both an inlet means that is in communication with the annular catalyst space and an exit means that is in communication with the inner conduit space, extends outside of the combustion chamber. A radiant burner is oriented to direct a flux of radiant energy to the surface of the outer conduit of the tubular reaction chamber. If a multiplicity of such tubular reaction chambers are used, they can be oriented concentrically around a centrally disposed radiant burner that uniformly radiates in a 360 degree arc. The radiant burner may consist of metal fiber material, or ceramic fiber material.

These and other objects and advantages of the invention, as well as the details of an illustrative embodiment, will be more fully understood from the following specification and drawings, in which:

DRAWING DESCRIPTION

DETAILED DESCRIPTION

Figure 1:
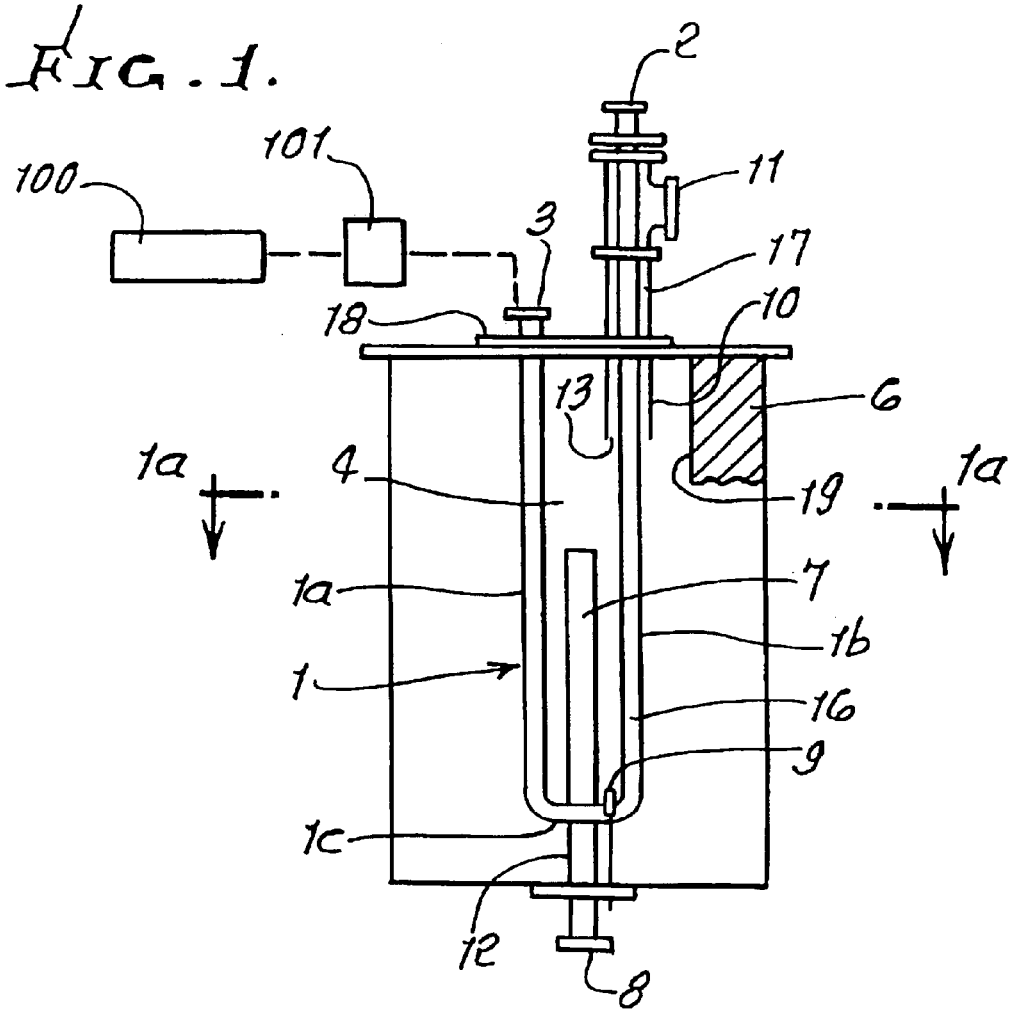
FIG. 1 is an elevation showing assembled components of the endothermic catalytic reaction apparatus.
Figure 1A:
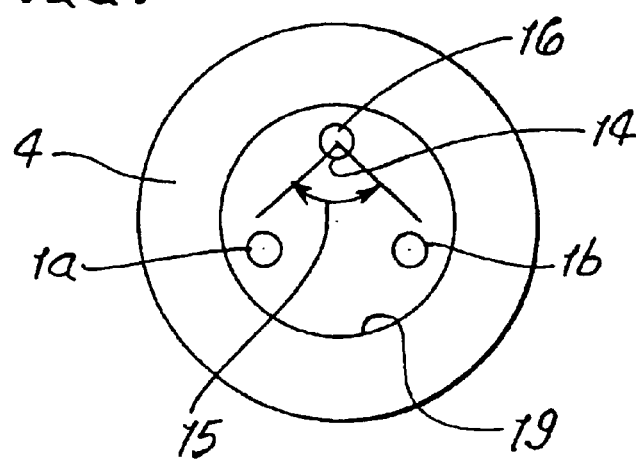
FIG. 1a is a section taken on lines 1a—1a of FIG. 1.

The catalytic reaction apparatus seen in FIG. 1 depicts a preferred embodiment of the present invention. The apparatus comprises a combustion chamber 4, a convection chamber 17 extending into chamber 4, and a reaction chamber 16. The combustion chamber 4 is defined by the zone enclosed or surrounded by refractory insulation 6. The reaction chamber 16 is defined by the volume enclosed by tubular reactor conduit 1. The tubular reactor conduit 1 is formed in a U-tube or hairpin configuration having parallel upright legs 1a and 1b, and a U-shaped bend 1c, and can be removed from the combustion chamber upon removal of a top flange 18. Leg 1b of the tubular reactor conduit 1 passes concentrically through the convection chamber 17 defined by the space enclosed between the convection conduit 10 and the leg 1b of the tubular reactor conduit 1. The reaction chamber including 1a, 1b, and 1c is packed with catalyst from the inlet fitting or means 2, where reactants enter, to the outlet port or means 3 where products exit. Convection conduit opens at 13 to chamber 4, and discharges at 11.

An axially extending, vertically disposed radiant burner 7 is supported by a burner gas conduit 12 that conveys a mixture of fuel and oxidant from an inlet means 8 to the radiant burner. In this embodiment, the radiant burner 7 comprises a gas permeable metal fiber zone 14 and a non-permeable zone 16. Fuel and oxidant pass through the permeable metal fiber zone 14 where they are ignited on the surface thereby combusting and releasing heat to form an incandescent zone that radiates energy outward in an arc 15. The arc angles $\gamma_1$ and $\gamma_2$ of 14 and 16 are such (angle of 14 is between 45° and 180°) that the radiating pattern maximizes the flux of radiant energy to the surfaces of the tubular reactor legs 1a and 1b, and also U-bend 1c, while minimizing the flux of radiant energy to the internal wall 19 of combustion chamber 4. Fuel and oxidant are initially ignited on the surface of the permeable metal fiber zone 14 using an igniter 9. Once ignited, the combustion reaction on the surface of the metal fiber zone 14 facing 1a and 1b is self-sustaining.

Figure 2:
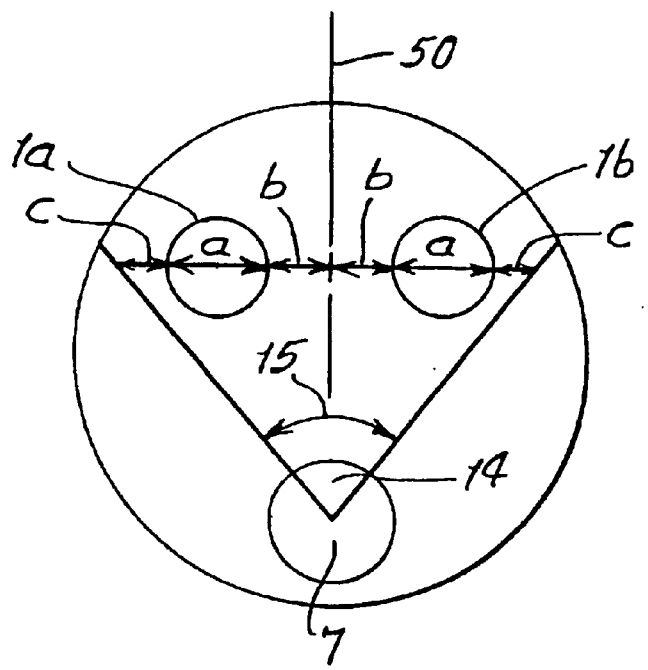
FIG. 2 is a diagrammatic view of dimensional characteristics of the FIGS. 1 and 1a assembly.

The radiant arc angle of 14 is selected so that the direct radiant flux from the burner that bisects the projected surface of the reaction chamber tube wall is a minimum of 50% of the total radiation flux that emanates from the active radiant burner surface. As an illustration of the condition, FIG. 2 depicts a geometric representation of the preferred embodiment of the present invention. The active radiant zone 14 emits radiation along a line of sight defined by a radiant arc 15 that impinges on the reaction chamber conduit legs 1a and 1b and the inner surface 19 of the combustion chamber. The emitted radiation is bisected by hypothetical plane 50 passing through the centerline of the U-tube reaction chamber. The projected area of the reaction chamber surfaces per unit tube length receiving direct radiation from the burner within the controlled radiant arc is given by a+a=2a, where "a" is the outer diameter of each leg. The total radiation within the arc 15 is given by c+c+a+a+b=2c+2a+b. The dimensions "a", "b" and "c" are as shown. In the preferred embodiment of the present invention, the ratio of 2a divided by 2c+2a+b is typically greater than 0.5 or 50%.

In the present invention, the radiant burner combustion intensity is controlled in the range of 150,000 btu/ft$^2$/h and 350,000 btu/ft$^2$/h wherein the combustion intensity is defined as the higher heating value of the fuel combusted divided by the permeable radiant burner surface area and the excess combustion air operating air ratio is controlled in the range of 30% to 100% (wherein the excess air ratio is defined as percent combustion air in excess of the stoichiometric amount required for complete combustion of the burner fuel) to prevent overheating of the surface of the radiant burner and to prevent overheating of the premixed fuel and oxidant contained within the burner core. In the present invention, the reactant mass velocity is controlled in the range of 400 lb/ft$^2$/h to 1500 lb/ft$^2$/h in order to limit the reaction chamber tube wall temperature to the desired range of 1300° F. to 1500° F.

Combustion products emanating from the permeable metal fiber zone 14 enter the inlet 13 leading to the convection chamber 17, wherein the combustion products exchange heat with tubular reaction chamber 1 for preheating the feed to leg 1b.

EXAMPLE

A compact endothermic catalytic reaction apparatus according to the preferred embodiment was constructed and tested. The reaction chamber consisted of 1 inch schedule 40 pipe constructed of 310 stainless steel that was formed in a U-tube arrangement spaced on 3 inch centers. The reaction chamber was packed with a commercial steam reforming catalyst that was crushed and screened to an average particle size of approximately ¼ inch.

The radiant burner consisted of 4 inch long by 1½ inch outer diameter cylindrical assembly that had an active radiant angle $\gamma_1$ of 120 degrees. The burner assembly was placed in an insulated combustion chamber having dimensions of 6 inch internal diameter and 10 inch height. The radiant burner assembly was spaced approximately 4 inches from the U-tube centerline. The convection chamber consisted of a 2 inch tube constructed of 304 stainless steel.

The radiant burner was fired using a mixture of propane and air at a total higher heating value firing rate of 12,000 btu/h. The reactant mixture consisted of 1 lb/h of propane and approximately 3.5 lb/h of steam and was fed to the reaction chamber at a temperature of approximately 800° F. The reactant mixture was heated in the reaction chamber to an exit temperature of 1250° F. The measured tube wall temperature of the reaction chamber was 1450° F., the radiant burner surface temperature was 1750° F., and the combustion products exit temperature was 1050° F. The estimated hydrogen plus carbon monoxide yield was 67 SCFH.

Figure 3:
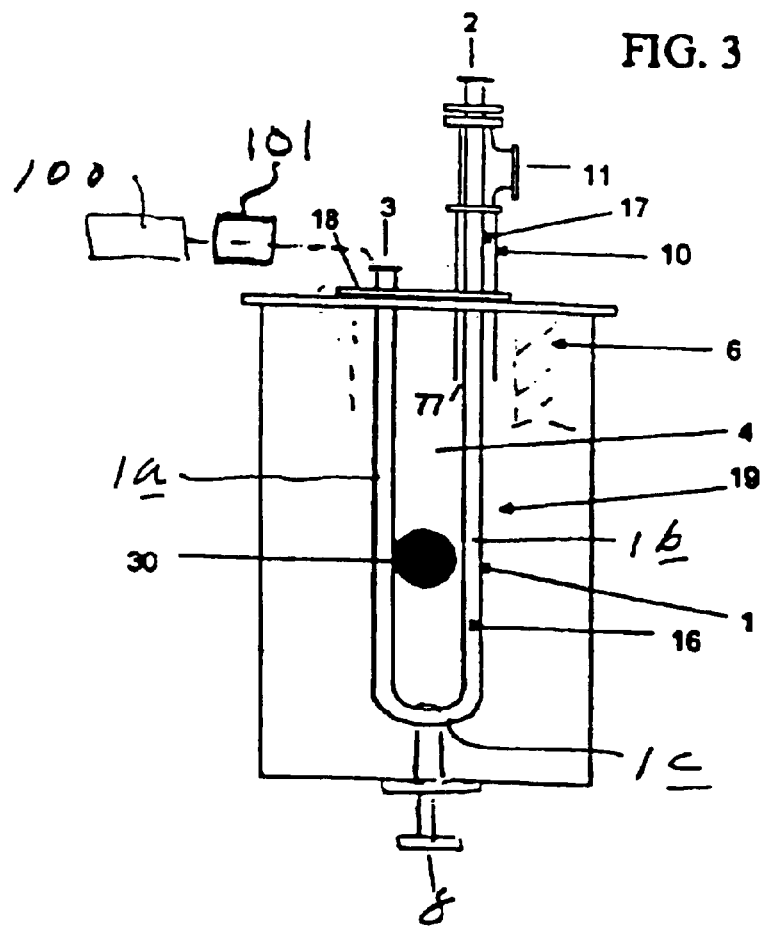
FIG. 3 is a view like FIG. 1, but showing a modification.
Figure 3A:
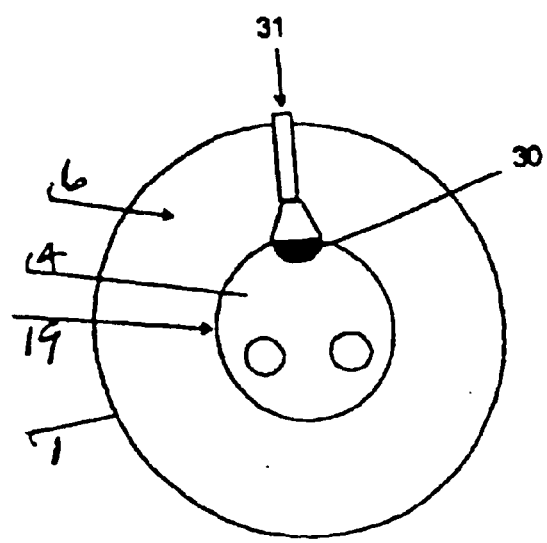
FIG. 3a is a section taken on lines 3a—3a of FIG. 3.

FIG. 3 depicts another embodiment of the present invention. In this embodiment, a radiant burner surface 30 having a hemispherical geometry radiates energy to the reaction chamber like that of FIG. 1. A mixture of fuel and oxidant enters the radiant burner from an inlet conduit 31. The longitudinal axis of the inlet conduit is oriented normal to the plane of the U-tube reaction chamber.

Figure 4:
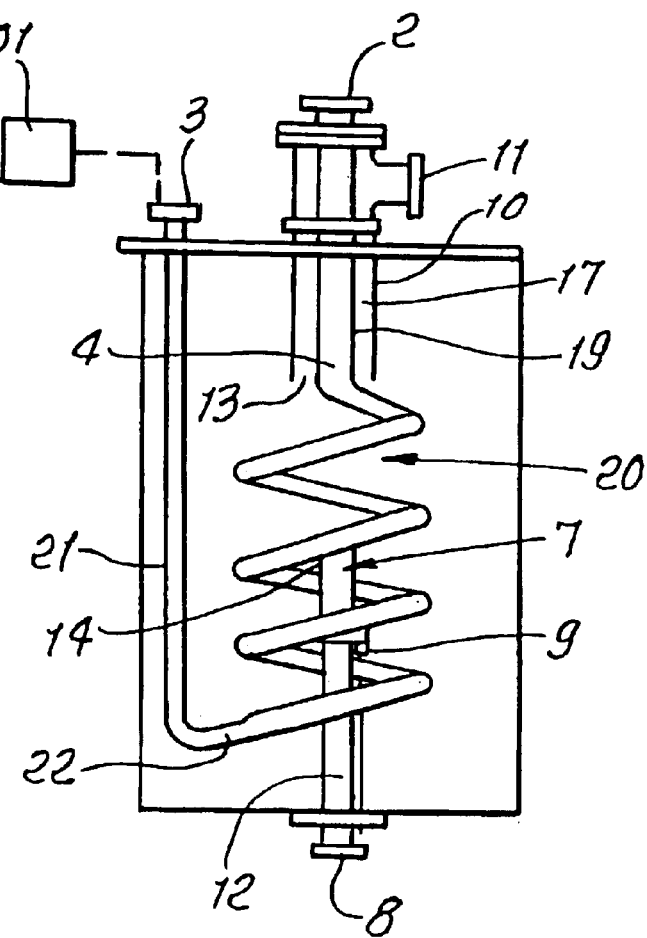
FIG. 4 is a view like FIG. 1, but showing an additional modification.

FIG. 4 depicts yet another embodiment of the present invention. In this embodiment, the reaction chamber is defined by a volume enclosed by a tubular reactor conduit comprising an upper section 19 consisting of a vertically disposed tube that is connected to the inlet means 2, a lower section 20 consisting of a helical coil, having an outer diameter between 6 and 36 inches, and an exit section 21 consisting of a vertically disposed tube that is connected to an exit means 3. The upper section 19 of the tubular reactor conduit passes concentrically through the convection chamber 17. The reaction chamber is packed with catalyst from the inlet means 2, where reactants enter, to the outlet zone 22 of the lower section 20. The reaction chamber has outer diameters ranging from ¾ inch to 4 inches.

An axially extending radiant burner 7 is vertically disposed along the central axis of the helical coil section 20 of the tubular reaction conduit. The radiant burner is supported by a burner gas conduit 12 that conveys a mixture of fuel and oxidant from the inlet means 8 to the radiant burner. In this embodiment, the radiant burner 7 comprises a gas permeable metal fiber zone 14 that subtends the entire circumference of the radiant burner. Fuel and oxidant pass through the permeable metal fiber zone 14 where they are ignited on the surface, thereby combusting and releasing heat to form an incandescent zone that radiates energy in a predominantly uniform radial direction. The helical tubular reaction chamber and catalyst therein are sized for creation of mass velocities ranging from 400 lb/ft$^2$/h to 1500 lb/ft$^2$/h. The catalyst in the helical tubular reaction chamber has average catalyst particle diameters ranging from ¼ to 1 inch for producing gas pressure drops ranging from 1 psi to 8 psi during flow through the reaction chamber. The helical tubular reaction chamber has gas exit end temperature ranging from 1150° F. to 1400° F., when heated by said radiant burner, in operation. The helical tubular reaction chamber has maximum tube wall temperatures ranging from 1300° F. to 1600° F., when heated by said radiant burner, in operation. The helical tubular reaction chamber has average heat fluxes ranging from 3,000 btu/ft$^2$/h to 10,000 btu/ft$^2$/h, when heated by said radiant burner in operation. The helical tubular reaction chamber is sized to have capacity to generate hydrogen plus carbon monoxide product in volumetric quantities ranging from 50 SCFH to between 100 and 1500 SCFH. The radiant burner comprises a supported metal fiber material consisting essentially of an alloy containing principally iron, chromium, and aluminum and smaller quantities of yttrium, silicon, and manganese, said alloy having extended life at operating temperatures up to 2000° F. The radiant burner has surface temperatures ranging between 1500° F. and 1900° F., in operation. The radiant burner has an operating combustion intensity typically ranging from 150,000 btu/ft$^2$/h to 350,000 btu/ft$^2$/hr, wherein the combustion intensity is defined as the higher heating value of the fuel combusted divided by the permeable radiant burner surface area. The radiant burner has an operating excess air ratio typically ranging from 30% to 100%, wherein the excess air ratio is defined as percent combustion air in excess of the stoichiometric amount required for complete combustion of the burner fuel. The helical coil has free area in the range 50% to 75%, wherein the free area is defined as the ratio of the free area between successive coil turns and the cylinder that bisects the helical coil circle.

In FIGS. 1, 3 and 4, a gas conditioning system 101 and fuel cells 100 to receive hydrogen are in operative communication with reactor outlets 3.

Figure 5:
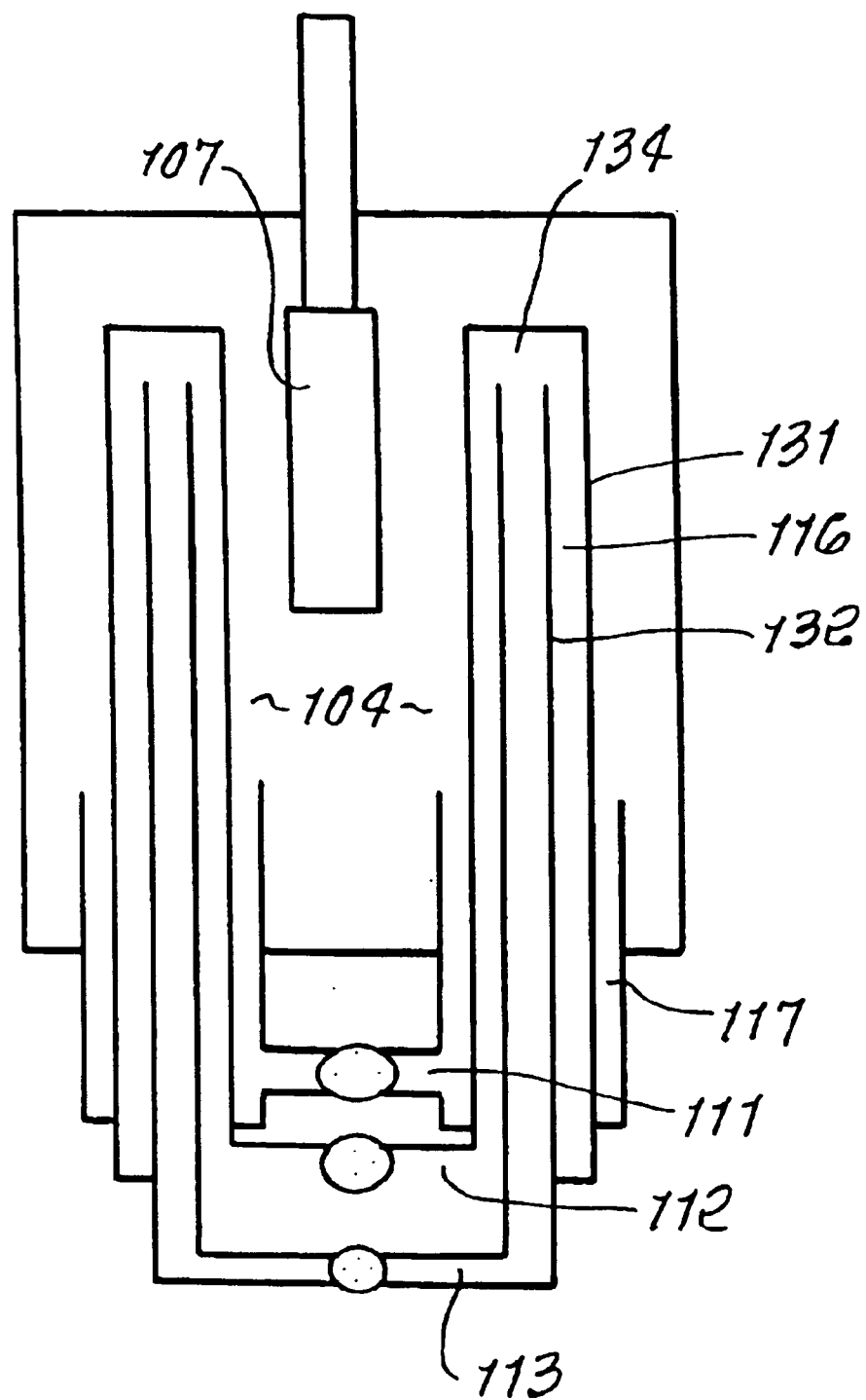
FIG. 5 shows another embodiment of the reaction apparatus.

FIG. 5 depicts yet another embodiment of the present invention. In this embodiment shown schematically the reaction chamber 116 is defined by the annular space between an outer conduit 131 and an inner conduit 132. The reactant gases enter the reaction chamber through inlet means 112, and pass through catalyst bed at 116 and then to space 134 at the inlet of the inner conduit 132. The reactant gases exit the inner conduit space through exit means 113. The reactant gases passing through the inner conduit 132 transfer heat to the reactant gases contained in the reaction chamber 116 to beneficially recuperate heat from the endothermic reaction.

An axially extending radiant burner 107 is vertically disposed within a combustion chamber 104. The radiant burner is oriented in parallel with the longitudinal extent of the tubular reaction conduit. If a multiplicity of such tubular reaction conduits are used, they can be oriented concentrically around a centrally disposed radiant burner that uniformly radiates in a 360 degree arc. The radiant burner transfers radiant energy to the surface of the outer conduits 131.

Combustion gases exiting the radiant burner 107 are introduced into a convection chamber 117 that is concentrically disposed around a portion of the outer conduit 131 in the proximity of the tubular conduit end containing the reactant gas inlet means 112. After transferring heat by convection to the outer conduit, the combustion gases exit at an outlet means 111.

Accordingly, the FIG. 5 embodiment includes:

a) a straight tubular outer conduit concentrically disposed around an inner conduit to form a reaction chamber containing catalyst in the annular space between the outer conduit wall and the inner conduit wall, for conversion of hydrocarbon to industrial gases by reaction with steam, and an inner conduit defined space for the return flow of reactant gases to an exit means; said tubular reaction chamber having one end that extends into the combustion chamber and an opposite end that extends outside of the combustion chamber, and there being inlet means that is in communication with the annular space and an exit means that is in communication with the inner conduit defined space, b) and a radiant burner vertically disposed within said combustion chamber and having a gas permeable zone that promotes the flameless combustion of fuel and oxidant supplied to said burner in order to heat the metal fiber surface of the burner to incandescence for radiating heat energy to the reaction chamber.

Also, there is typically a convection chamber extending about a portion of the tubular reaction chamber in the proximity of the end containing the reactant gas inlet and outlet means to enhance heat transfer from combustion products; said convection chamber having an inlet means that is in communication with the combustion chamber and an exit means for combustion products that is outside the combustion chamber.

The structure may be alternatively considered to represent a multiplicity of said tubular reaction chambers are provided and are concentrically disposed around a centrally located and vertically disposed cylindrical radiant burner having a 360 degree radiant arc.

It should be apparent to those skilled in the art that the subject invention accomplishes the objects set forth above.

I claim:

1. Endothermic catalytic reaction apparatus that includes a combustion chamber, comprising:

a) a straight tubular outer conduit concentrically disposed around an inner conduit to form a reaction chamber containing catalyst in the annular space between the outer conduit wall and the inner conduit wall, for conversion of hydrocarbon to industrial gases by reaction with steam, and said inner annular conduit defining a downward path for the return flow of reactant gases to an exit means; said inner annular conduit having an open upper end within the uppermost interior of said outer conduit for downward entrance of said return flow into the interior of said inner annular conduit, said path extending downward located between radially spaced inner and outer annular regions of catalyst in said reaction chamber, said reaction chamber having one end that extends into the combustion chamber and an opposite end that extends outside of the combustion chamber, and there being inlet means for said gases that is in communication with said catalyst inner and outer regions, and wherein said exit means is in communication with the inner conduit defined path, b) a radiant burner having a heat radiating surface vertically disposed within said combustion chamber and having a gas permeable zone that promotes the flameless combustion of fuel and oxidant supplied to said burner in order to heat said surface of the burner to incandescence for radiating heat energy to the catalyst containing reaction chamber, which faces the burner surface, c) a convection chamber extending about a portion of the reaction chamber containing inner and outer annular regions of catalyst and in proximity to said inlet means and to said exit means, said inner conduit wall, said outer conduit wall and said reaction chamber projecting annularly downwardly into said convection chamber proximate an annular entrance of gases into the reaction chamber, and d) said inlet means and said exit means spaced below said burner.

2. The apparatus of claim 1 wherein a multiplicity of said reaction chambers are provided and are concentrically disposed around said radiant burner having a 360 degree radiant arc.

3. The apparatus of claim 1 wherein said convection chamber enhances heat transfer from combustion products; said convection chamber having an inlet means that is in communication with the combustion chamber and an exit means for combustion products that is outside the combustion chamber.

4. The apparatus of claim 1 wherein the reaction chamber has opposite sides and including reactant gases flowing inside the inner conduit to transfer heat to the reaction chamber from said opposite sides thereof.

5. The apparatus of claim 1 wherein said radiant burner is comprised of a supported metal fiber material.

6. The apparatus of claim 1 wherein said radiant burner is comprised of a supported ceramic fiber material.

* * * * *